United States Patent
Moir et al.

(10) Patent No.: US 11,524,253 B2
(45) Date of Patent: Dec. 13, 2022

(54) WASH PRESS HAVING IMPROVED ROTOR STRUCTURE AND HOUSING FOR REMOVING THE SAME

(71) Applicant: SULZER MANAGEMENT AG, Winterthur (CH)

(72) Inventors: Kevin Moir, Capistrano Beach, CA (US); Todd Nydam, Newport Beach, CA (US); Rob Sabol, Orange, CA (US)

(73) Assignee: SULZER MANAGEMENT AG, Winterthur (CH)

( * ) Notice: Subject to any disclaimer, the term of this patent is extended or adjusted under 35 U.S.C. 154(b) by 4 days.

(21) Appl. No.: 16/640,409

(22) PCT Filed: Sep. 27, 2018

(86) PCT No.: PCT/US2018/053012
§ 371 (c)(1),
(2) Date: Feb. 20, 2020

(87) PCT Pub. No.: WO2019/067658
PCT Pub. Date: Apr. 4, 2019

(65) Prior Publication Data
US 2020/0368649 A1 Nov. 26, 2020

Related U.S. Application Data

(60) Provisional application No. 62/564,662, filed on Sep. 28, 2017, provisional application No. 62/564,645, filed on Sep. 28, 2017.

(51) Int. Cl.
*B01D 29/64* (2006.01)
*B01D 29/35* (2006.01)
(Continued)

(52) U.S. Cl.
CPC ....... *B01D 29/6476* (2013.01); *B01D 29/356* (2013.01); *B30B 9/121* (2013.01); *C02F 11/126* (2013.01)

(58) Field of Classification Search
CPC . B01D 29/6476; B01D 29/356; C02F 11/126; B30B 9/121
See application file for complete search history.

(56) References Cited

U.S. PATENT DOCUMENTS 3,285,415 A * 11/1966 James .................... B01D 21/20
210/768
3,997,441 A * 12/1976 Pamplin, Jr. .......... B01D 37/02
210/791

(Continued)

*Primary Examiner* — Liam Royce
(74) *Attorney, Agent, or Firm* — Sughrue Mion, PLLC (57) ABSTRACT

Provided is a wash press that separates liquids and solids from a waste stream. The wash press includes a tank having a semi-cylindrical shape. The tank has an inlet at a top of the tank for receiving a waste stream, a screen disposed in a portion of a bottom of the tank to permit liquid to pass therethrough, and an outlet for permitting solid materials separated from the liquid to pass therethrough. A rotor extends through the tank for transporting and dewatering the waste material entering the tank. The rotor includes a plurality of helical flights interconnected by paddle members to permit agitating the waste material. The wash press also includes a removable cover that enables the rotor to be lifted vertically, and a removably attached screen to facilitate replacement/repair of the same.

9 Claims, 12 Drawing Sheets

(51) Int. Cl.
*B30B 9/12* (2006.01)
*C02F 11/126* (2019.01)

(56) References Cited

U.S. PATENT DOCUMENTS

| | | | | |
|---|---|---|---|---|
| 7,081,171 B1* | 7/2006 | Sabol | ................ | B03B 5/00 |
| | | | | 134/18 |
| 2007/0044666 A1* | 3/2007 | Zittel | ................ | A47J 37/1214 |
| | | | | 99/348 |
| 2015/0231535 A1* | 8/2015 | Lee | ................ | B01D 29/23 |
| | | | | 210/457 |

* cited by examiner

WASH PRESS HAVING IMPROVED ROTOR STRUCTURE AND HOUSING FOR REMOVING THE SAME

CROSS-REFERENCE TO RELATED APPLICATIONS

This is a National Stage of International application of PCT/US2018/053012, filed Sep. 27, 2018, which claims the benefit of the provisional U.S. patent application Ser. Nos. 62/564,645 and 62/564,662 filed on Sep. 28, 2017, the contents of all of which are incorporated herein by reference in their entirety.

BACKGROUND OF THE INVENTION

The municipal wastewater industry has classically used spiral compactor technology to reduce the water content of screenings collected by open-channel bar and perforated plate screens. A downside to simply compacting the material is that biologically-unstable organics typically remain in the compacted product. Once deposited in a collection container, these organics are prone to produce foul odors and commonly become a vector attraction problem (insects and other living organisms that can transport biosolids pathogens away from the land application or surface disposal site).

In order to reduce the odor and vector characteristics of the screenings, a wash feature was incorporated into the compactor design to actively separate the organics from the non-biodegradable element of the screening. The resulting device is commonly referred to as washer/compactor or wash press.

Figure 11:
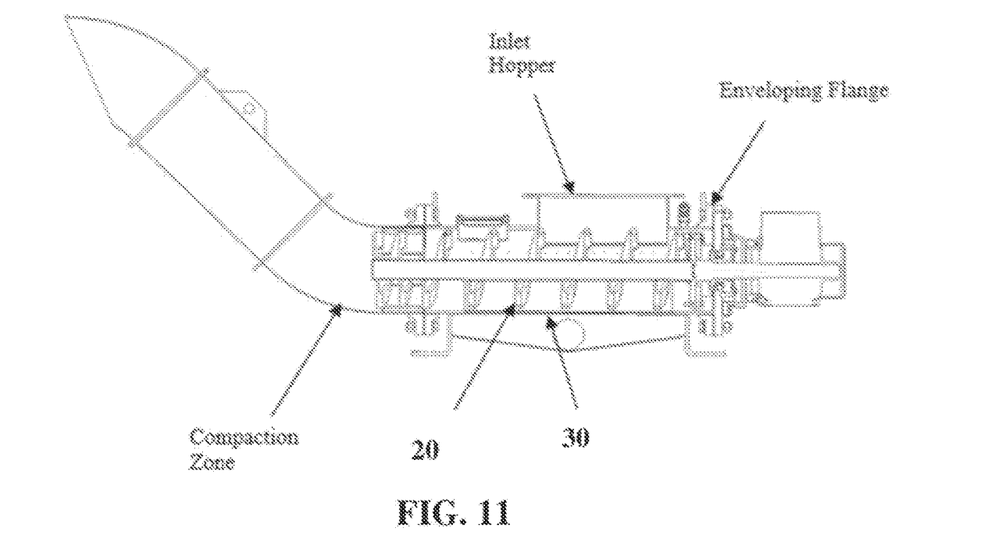
FIG. 11 is a section view showing typical wash press elements.
Figure 12:
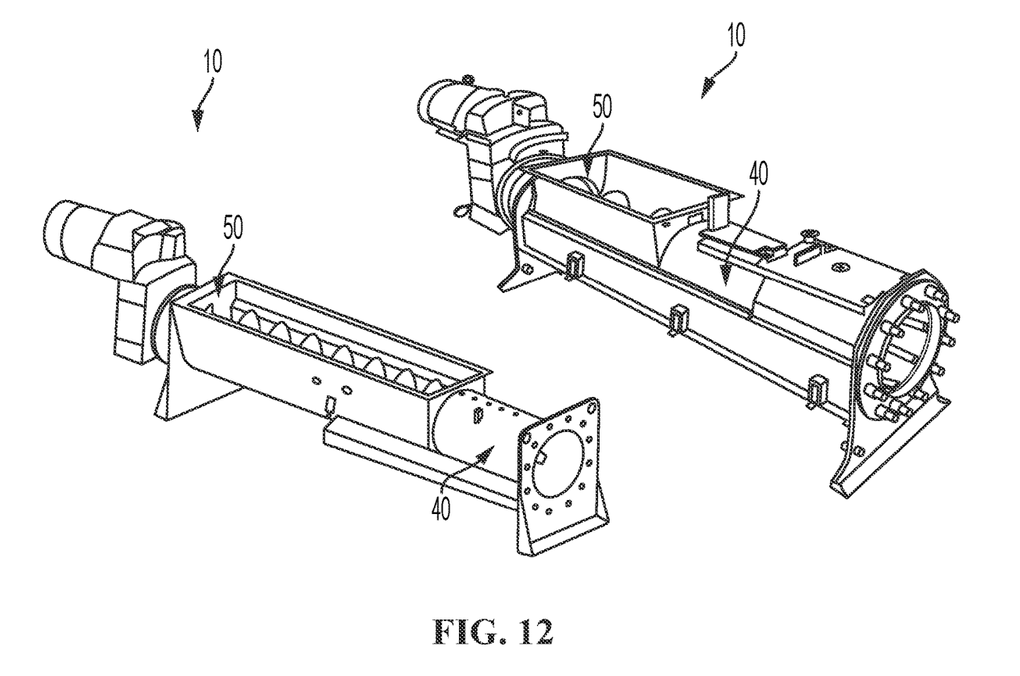
FIG. 12 is a view showing current wash press tank design limitations.

Screenings are typically collected on a perforated or wedge wire screen trough housed within a tank (wash press 10). See FIGS. 11 and 12. A coil-shaped brush on the rotor 20 sweeps the screen 30 to keep the openings clear. Unfortunately, as material falls from the open-channel screen (not shown), some of it inevitably lands on the bristles of the coil-shaped brush. Stringy bits of rags or feminine sanitary products may catch in the brush and become the starting point for other material to attach and form what are commonly called ropes. As a result of the rotation or winding of the rotor 20, these ropes can grow within the flights of the rotor until they begin to impede the operation of the equipment.

Additionally, screenings that fall into the screen trough are collected into piles between the flights of the rotor. To separate out the organics, various washing techniques have been implemented to-date; however, a common method is to spray water onto the screenings captured by the wash press screen. Depending on the size of the piles and the spray pattern and pressure of the wash water, the degree of organics separation or washing may be minimal. Furthermore, as the rotor operates, the piles tend to sit on the lower portion of the screen without being significantly disturbed. This behavior can result in organics being bound or trapped within each pile, limiting the degree of cleaning that can be achieved.

As these wash presses operate, they are subject to wear resulting from materials pulled from the waste stream by the channel screens. Examples of extracted materials may include: rags, shoes, articles of clothing, condoms, chunks of asphalt, bits of wood, money, wipes, rocks and many other items that are often flushed down the toilet or washed down the drain by industry and the general public. The resulting wear on the wash press periodically needs to be addressed. Common wear items include the coil-shaped brush, the screen 30 and the rotor spiral 20 itself.

Figure 13:
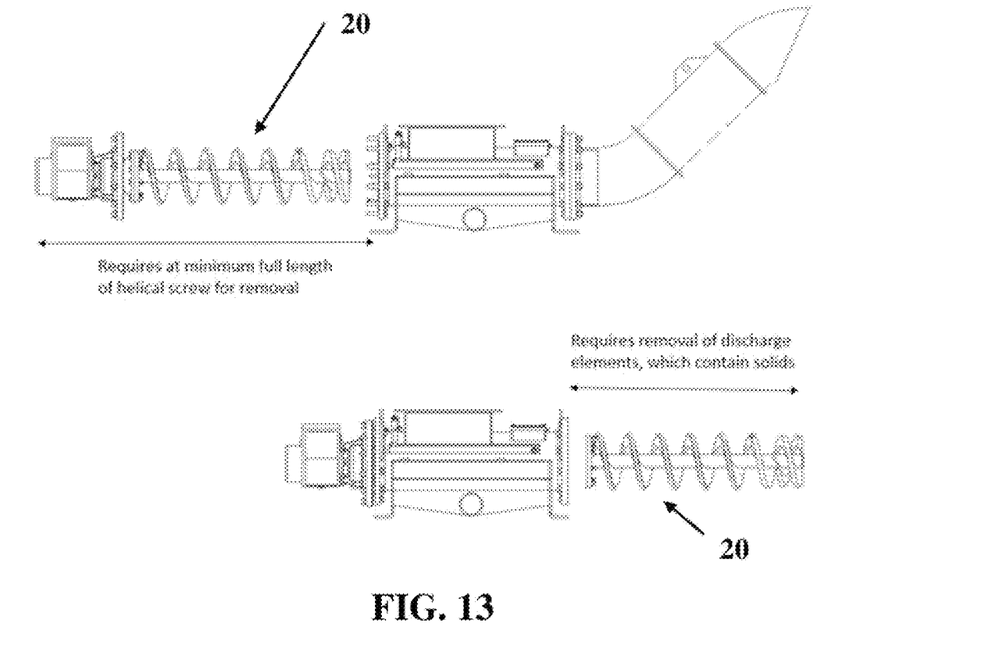
FIG. 13 is a view showing current wash press helical rotor removal methodology.

Another problem in the related art access to internal components of the wash press. Since the helical screw and its elements are performing most of the work in the function of the device, maintenance or replacement of the helical screw and its elements is required periodically during the life of the device. Due to conventional structural restrictions, gaining access to the internal components of the wash press tank 40 has required a large amount of space on one end or the other of the tank equal to the length of the rotor 20. This is because the rotor 20 must be extracted along its length through one end of the tank 40 to evaluate the condition of the components or to perform maintenance. (See FIG. 13). Current designs only allow the removal from either end of the casing or tank 40. This is required due to the fully encased drive and driven end of the casing via the tank end flange 50. Additionally, the casing must be enclosed at either end to provide proper sealing of the liquid and solids and to provide proper structural support. (See FIG. 12). Allowing for this space (horizontal) may increase the cost of the building housing the components, or increase the effort required to maintain the equipment by forcing maintenance staff to move the entire wash press to another location to perform the work.

Additionally, even with the rotor pulled clear of the tank, the coil-wound brush itself can be difficult to replace. Such brushes can consist of several turns or pitches of stainless steel strip formed around brush bristles and an anchor wire. The brush can be unwieldly, and care must be taken not to bend or kink the brush in a way that would result in permanent damage. Such damage would result in replacement of an otherwise new brush.

Further, in conventional structures, the perforated plate or wedge wire screen trough is commonly welded into the wash press tank. A limitation of welded-in troughs is that replacement of the screen requires the tools and skill of a metal fabricator. This requirement can become costly and time consuming should the screen need to be replaced because of damage or changes in the process requirements. In some cases, limited availability of metal fabricator services may result in a costly requirement to replace the entire tank.

In summary, notable deficiencies with common washer/compactor or wash press equipment include: roping of the non-soluble material; difficulty getting the soluble material separated from the non-soluble material; difficulty and expense associated with accessing the internal wear components; the difficulty and expense of replacing the brush on the rotor, and; the difficulty and expense of replacing the screen inside the tank.

SUMMARY OF THE APPLICATION

Figure 1:
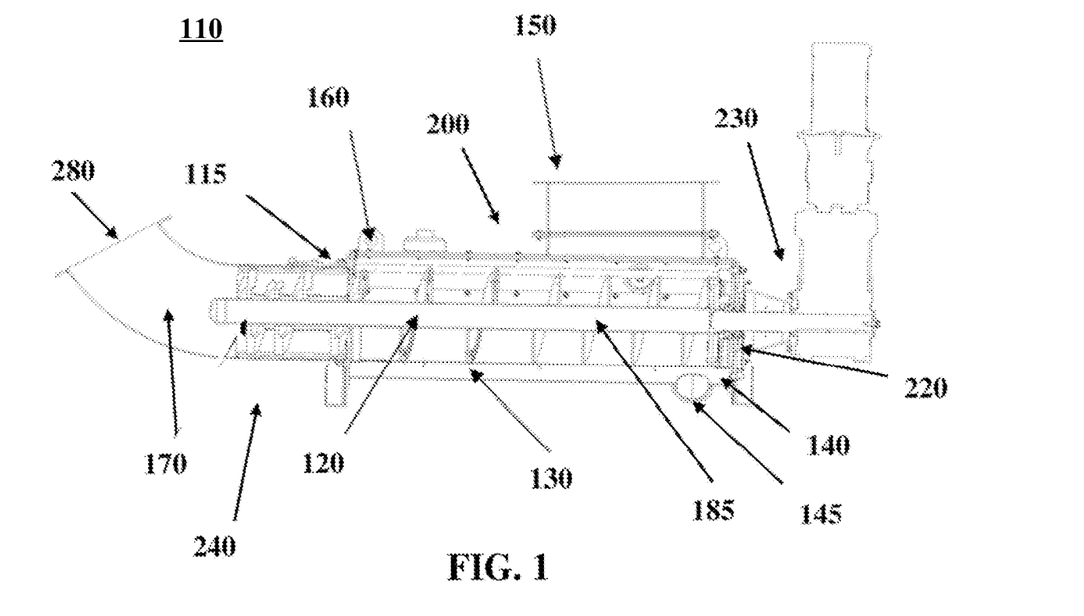
FIG. 1 is a section view of an embodiment of a wash press.
Figure 2:
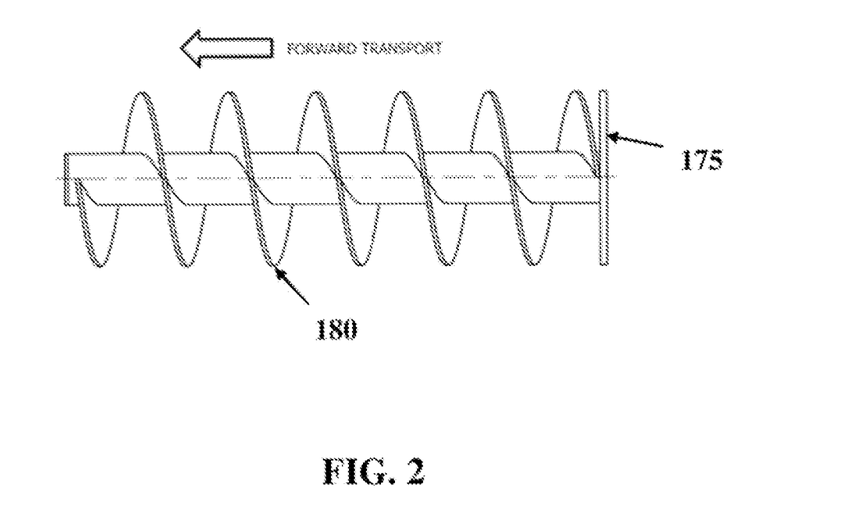
FIG. 2 is a view of a traditional rotor with continuous flights.
Figure 3:
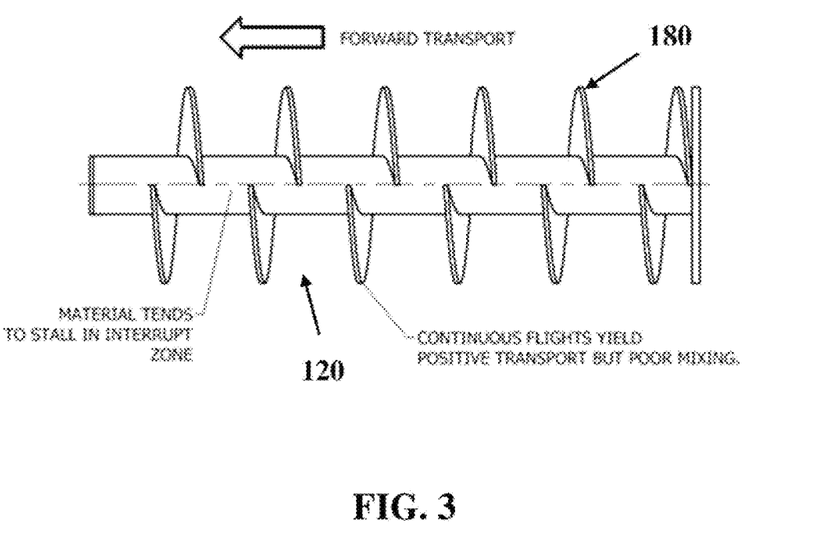
FIG. 3 is a view of a traditional rotor with interrupted flights.

With reference to FIG. 1, wastewater screenings compactors, washer/compactors or wash presses 110 include the following elements: (i) an inlet hopper 150 to receive waste water screenings; (ii) one or more water spray systems 160 to promote material transport and break up soft organics; (iii) a screen 130 to capture non-biodegradable material and allow water and soft organics to drain off to be returned to the waste stream; (iv) a rotor 120 enclosed in a tube or trough to convey liquid-laden non-biodegradable material to the compaction zone 170 (the auger rotors may consist of multiple-pitch, continuous helical flights (FIG. 2) or interrupted helical flights (FIG. 3)); (v) a compaction zone 170 comprised of a segment of pipe elbow or tube with weighted flap at the discharge end (FIG. 1).

No Pre-Wash Zone Brush

In order to address the roping behavior of stringy non-soluble matter, focus was put to eliminating rotor features on which stringy bits could catch. The brush was removed from the rotor in the area adjacent the inlet hopper 150 where material is received from the channel screen. Even if stringy material was to lay across individual helical flights on the rotor 120, there would be no opportunity for the strings to get purchase or grab hold on the rotor 120 in a way that could result in the formation of a rope. Gravity keeps the material low in the screen trough, and the stringy, non-soluble material is moved through the wash zone for cleaning and ultimately off the end of the rotor 120 for compaction.

Rotor Paddles

One challenge was to find a way to modify the machine to improve the cleanliness of the screenings in a system that does not use a grinder to shred the material. Instead of having interrupted flights and stationary paddles attached to the stationary trough, in the embodiment of FIG. 4, the paddles 190 are disposed in the rotor 120, fitting them between individual flight segments 180.

While the paddles 190 can be placed exactly parallel to the rotational axis of the rotor 120 with the length (a) set to be less than or equal to half the pitch (b) of the helical segment 180 (FIGS. 4 and 5), additional benefits may be realized by providing a forward angle 195 to promote forward transport of the material (FIGS. 6, 7, 9 and 10).

According to another aspect, the angle of the paddle can be increased and another plate can be added in front of the existing axially-aligned paddle, ultimately forming a triangular section. In this configuration, the angled paddle can push the material forward as compared to the non-angled (0°-angled) paddle, which tends to leave material in the same place along the length of the rotor. Forward paddle angles of 0° to 45° seem to be most efficacious. Above a 45° angle, there is a less effective disturbance of the piles and the mode is primarily a transport mode.

Figure 4:
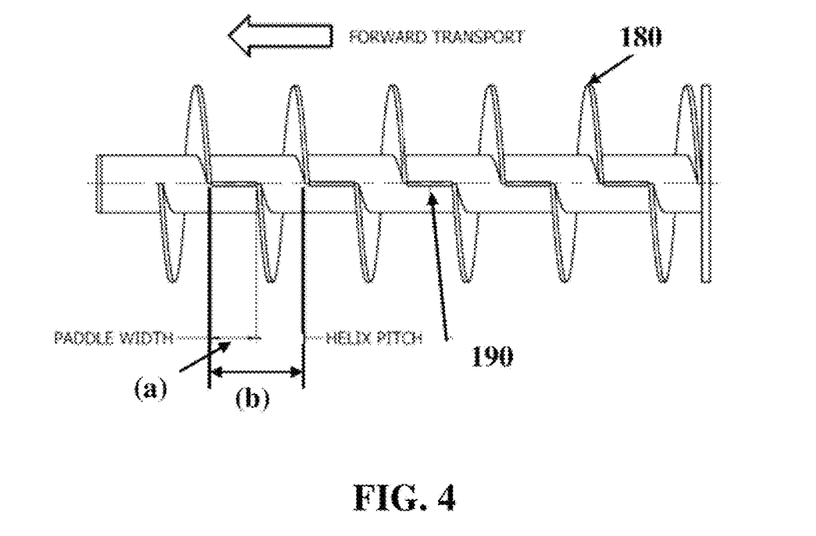
FIG. 4 is a view of an embodiment of the paddle rotor design.

In addition, for different materials (in the waste stream) there may be preferred ratios of effective pitch (b) to the axial length (a) of the paddle 190 (FIG. 4). For most materials, the paddle axial length should not be more than 50% of the effective pitch such that (a)≤50% of (b).

According to another aspect, it is noted that continuous helical flights (FIG. 2) provide little mixing (disturbance) of the material captured by the screen 130, and therefore, less opportunity for any soft or dissolvable solids to drain away. To increase exposure of the material to the wash water, the rotor may be operated using a forward/reverse sequence. However, this forward/reverse sequence must be controlled via programming in the device's controller, with accompanying long-term negative effects on the rotor caused by fatigue and fretting failures, and does little to disturb the pile to expose the soluble material.

Further, interrupted flights (FIG. 3) tend to encourage longer dwell times of the screenings that may improve washing; however, longer pieces tend to staple or wrap over the radial edges of the flights. These stapled pieces will then combine with other constituents of the screenings to form ropes which can clog and jam the device. Another consequence of the interrupted flight is that the movement of the material is uncontrolled in the interrupt section. Material will stall in the interrupt section until additional material arrives to displace the stalled material. Interrupted flight machines may also be operated with forward/reverse sequences, with similar issues to continuous helical flight machines.

In summary, continuous helical flight machines do not adequately disturb the pile to allow soft organics to separate from the screens. Interrupted flight machines are plagued by material wrapping over the leading edges of the individual flights resulting in roping and clogging as well as stalling of the material in the interrupt section. Forward/reverse sequencing has a net zero effect on the transport profile while inducing unwanted cyclic stresses in the drive mechanism.

Incorporating paddle features into the rotor results in interruptions of the helical flight. Furthermore, the use of sectional helical flights of formed steel plate significantly increases the complexity of mounting a coil-wound brush with stainless steel backing. The use of disk brushes bolted to the front side or the back side of the sectional flights facilitates initial assembly and replacement in the field. Disk brushes are commonly comprised of a plastic disk-shaped base with holes drilled in the outer cylindrical surface into which are pressed tufts of bristles held in with stainless steel pins. The disk brushes are cut to allow formation into a helical shape and may be pre-drilled facilitate bolting to the rotor sectional flights. These disk brushes are easy to handle and may be installed using common tools.

According to another aspect, certain embodiments seek to eliminate the need for large areas about either end of the wash press by creating a tank design that allows for a third direction (Vertical) of removal of the helical screw, as well as still maintaining removal from either end of the tank.

Figure 14:
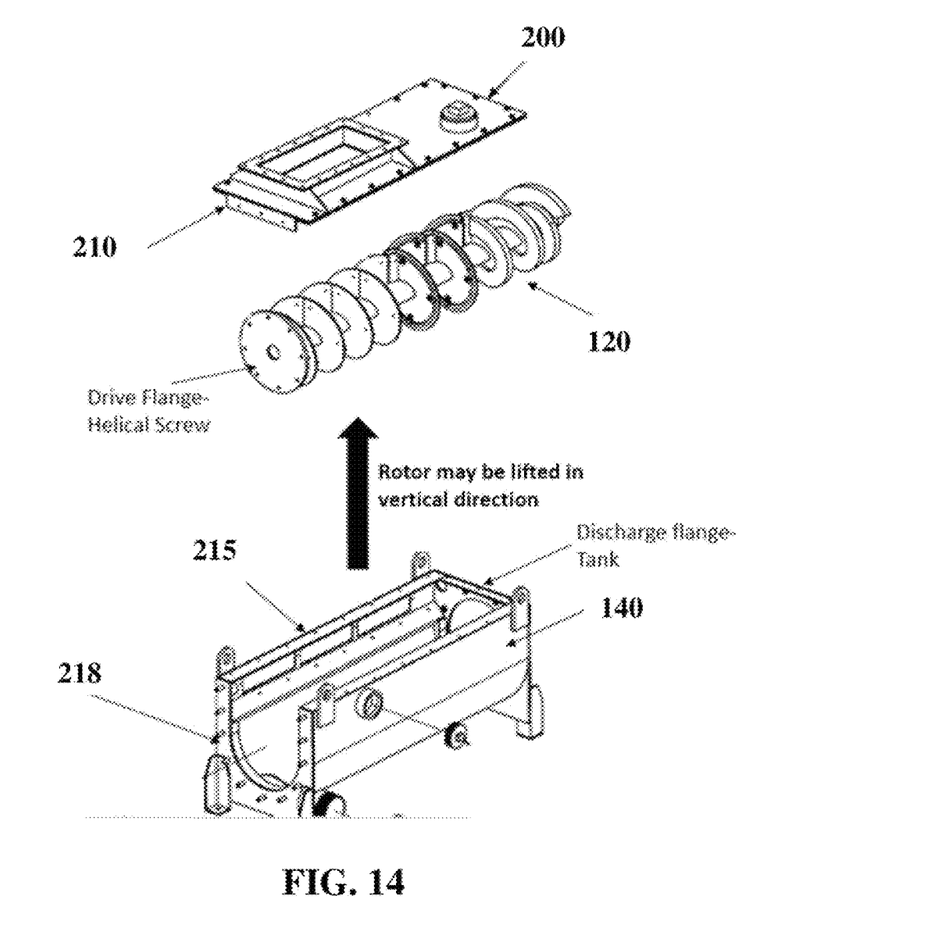
FIG. 14 is a view of the invention with vertical lift helical rotor.

In order for the rotor to be lifted from the tank vertically, the end plate and top cover of the tank are designed to separate to create an opening that would allow the full rotor assembly to be lifted vertically. According to the embodiments disclosed herein, this is achieved by configuring part of the tank or casing to separate with the top cover, which creates a vertical opening instead of a full enclosure. Further, to ensure proper sealing after re-assembly, the geometry at the separation point is designed so that when the parts are aligned and re-engaged a proper seal is formed to contain the liquid and solids in the wash press. (FIG. 14).

Removable Screen

Figure 18:
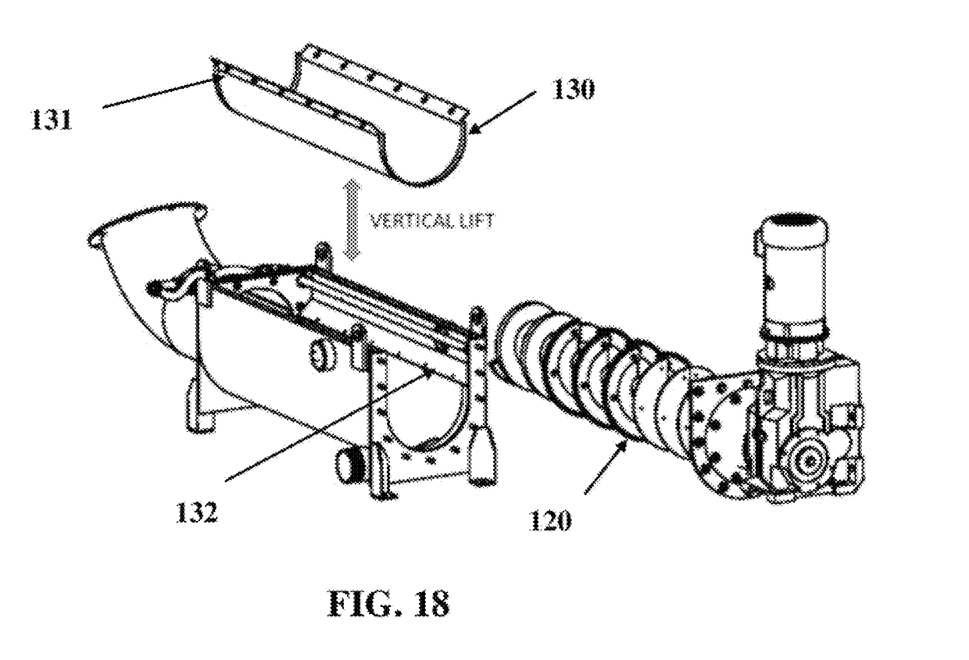
FIG. 18 is an isometric view of the wash press with screen removed.

Another aspect relates to the screen 130 of the wash press 110 and its repair or replacement. The access to the interior of the tank 140 afforded by the multi-directional rotor-removal tank feature facilitates the removability of the screen trough element in a vertical direction. By incorporating features that permit the screen 130 to be bolted into the tank 140, the removal and replacement of the screen 130 may be accomplished with common tools and no longer requires the tools and skills of a metal fabricator. This configuration facilitates replacement of the screen for repair or to accommodate changes in process requirements (FIG. 18).

BRIEF DESCRIPTION OF THE DRAWINGS

The above and other features and aspects of the present application will become more apparent by describing non-limiting exemplary embodiments thereof with reference to the attached drawings in which.

DETAILED DESCRIPTION OF THE EXEMPLARY EMBODIMENTS

According to exemplary embodiments described herein, as is generally shown FIG. 1, the washer/compactor or wash press 110 is comprised of: a horizontal tank 140 with base and an internal semi-cylindrical screen 130, a liquid drain 145 positioned beneath the screen 130, a solids discharge port 115 at one end of the screen, and a top cover 200 of rectangular profile bolted and sealed to the tank 140 to inhibit leakage, such that a rotor 120 with a shaft/center pipe 185 positioned on the axis and at one end of the rotor 120 that lays in the trough created by the screen 130 with its axis substantially parallel to the axis of the tank 140 where the shaft 185 protrudes from one end of the tank and a portion of the helical flights 180 and center pipe protrude from end of the tank opposite the shaft with the purpose of transporting the material in the axial direction of the tank (compaction zone 170); a drive mounting plate 220 comprised of a flat plate oriented perpendicular to the axis of the tank and fastened to the shaft end of the tank 230 and through which passes the shaft; a bearing and seal element is mounted to the outside of the drive plate 220 opposite the screen 130 and fitted with rubber elements selected to inhibit leakage between the seal and the drive mounting plate 220 and the seal and the shaft; an electro-mechanical drive 198 consisting of a speed reducer, electric motor, speed reducer mounting adapter spool and couplings assembled such that an adapter is connected to the drive plate 220 and accommodates mounting of the speed reducer such that the shaft 185 passes through both the mounting adapter spool and the speed reducer, rotationally fixing the shaft to the speed reducer with a square cross-section steel key or other method, and axially constraining the shaft in one direction by a shoulder washer fitted to a step in the shaft on the mounting adapter spool side of the speed reducer and in the other direction by a retaining washer fastened to the free end of the shaft using a bolt held in place with fixing means on the opposite side of the speed reducer (other methods are acceptable) and an electric motor attached to the speed reducer in accordance with common practice; a discharge pipe with internal wearing anti-rotation bars on the discharge end 240 of the tank opposite the drive for giving support to the end of the rotor opposite the shaft and to convey material to the compaction segment 170, which may consist of a compaction elbow and tapered tube fastened to the discharge and oriented to impose a positive change in elevation of the processed by the system or a horizontal or bent section of pipe with a weighted or electro-mechanically (or similar) actuated door, resulting in a packing behavior that will dispel liquid contained within the material; a wash water spray system 160 consisting of pipes fitted with orifices or nozzles oriented parallel with the axis of the rotor and above or below the screen, the water from which is controlled by an electro-mechanical solenoid valve, and; an inlet/hopper 150 consisting of a horizontally-rectangular profile located on the top of the tank 140 nearest the drive and suitable to receive screenings in the vertical direction from an external source.

Figure 17A:
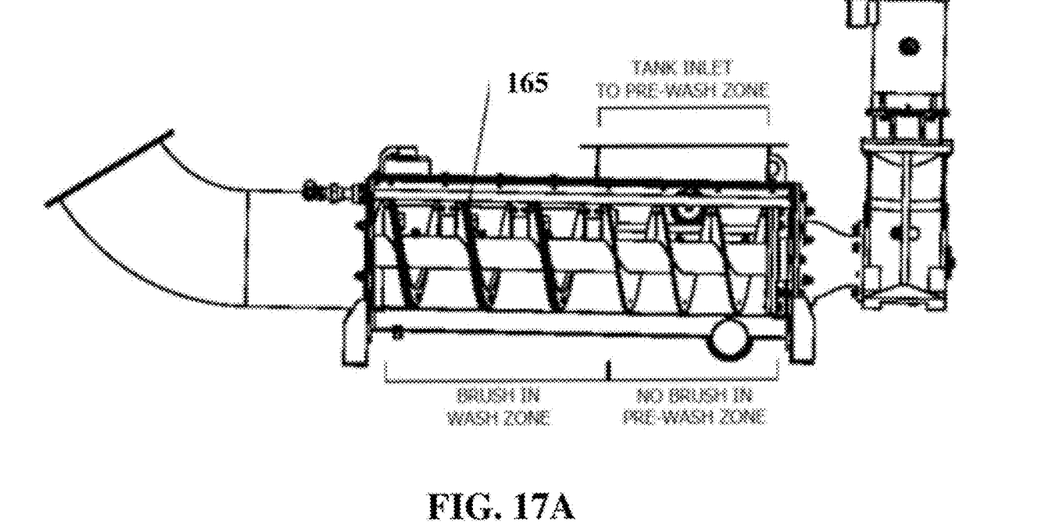
FIG. 17A is a sectioned view showing the rotor with brush.
Figure 17B:
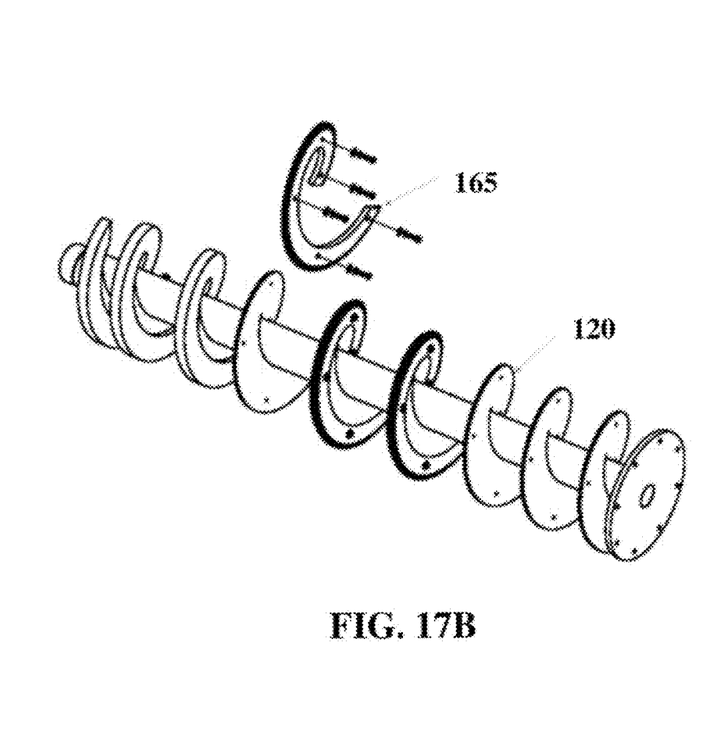
FIG. 17B is an isometric view of the rotor with a brush segment removed.

In addition to the shaft 185, the rotor is comprised of: several continuous pitches of helical fighting 180 formed from rectangular bar or by welding together circular profile elements of flat plate each formed to a helix, either embodiment having a clear inner diameter of roughly one quarter of the outer diameter of the helical fighting 180; a center pipe 185 with outer diameter to suit fitting within the inner diameter of the helical fighting 180 and a length equal to the length of and welded to the inner diameter of the fighting 180 providing axial rigidity to the helical flighting 180; a drive plate 175 of circular profile oriented perpendicular to the axis of the flighting 180 to which is welded one end of the helical flighting 180 and the center pipe 185 to retain the fighting and center pipe in the axial direction and to allow the transfer of rotational torque from the drive into the rotor, and a coil-shaped brush 165 (FIGS. 17A and 17B) affixed to a portion of the outer circumference of the helical flights with the function of sweeping the screen to transport material and keep the openings in the screen 130 clear.

In operation, the wash press 110 remains inactive until material collected by one or more open channel screens is received via the inlet/hopper 150 until the pile(s) of material collected on the screen 130 between the flights 180 is large enough to make it worthwhile to initiate a run cycle of the machine. In this embodiment, the rotor motor is energized in accordance with a pre-programmed, user-adjustable run cycle consisting of a series of clockwise and anti-clockwise rotations of the rotor 120 resulting in movement of the material on the screen in the direction either toward or away from the compaction segment. The resultant movement of the material off the end of the rotor 120 results in a piling behavior, and ultimately a compacting behavior of the screenings. This compaction in turn results in free water being dispelled from the screenings at the compaction interface. The liquid flows toward and ultimately through the screen 130 and to the drain 145.

Paddle Rotor Configurations

In this exemplary embodiment, the helical flights 180 on the auger rotor are periodically interrupted with flat plates (or paddles 190), oriented substantially-parallel to the rotor axis, bridging the gap between flight segments 180 (FIG. 4). The paddles 190 are intended to disturb the screenings ("flip" the pile as one might flip an egg with a spatula). The lifting action on the screenings caused by paddles 190 exposes additional surfaces of the screenings to the wash, removing additional soft organics from the material. The paddle 190 also serves to control movement through the device to slow down the forward movement to gain advantage of additional washing without the need to stop, reverse and restart the screw. By lifting the material via the paddles 190 on the rotor in the wash zone, improved washing and separation is achieved. The product will be a more compact, cleaner and dryer discharge from the device, which will ultimately decrease disposal costs to the owner.

The width (a) and angle 195 of each paddle are selected to control the degree of disturbance and rate of transport of the captured solids.

Additional paddle geometry can be added to form a wedge such that material is disturbed and transported in the "forward" direction and simply disturbed in the "reverse" direction. Also, the paddle/flight geometry can be modified to form a pocket such that material is disturbed and transported in the "forward" direction and disturbed and carried over in the "reverse" direction. The paddle/flight geometry can also be modified to form a pocket such that material is disturbed and carried over in both directions. The paddles 190 and helical flights 180 may have brushes 165 to aid in keeping the screen clean.

By controlling the amount of disturbance and the forward and reverse transport characteristics of the paddles, it is possible to optimize the cleanliness and throughput of the machine. Additionally, with certain materials, judicious control of the mixing and transport characteristics of the rotor will facilitate the elimination of the reverse sequences and the consequent stresses imposed on the mechanical systems.

Figure 5:
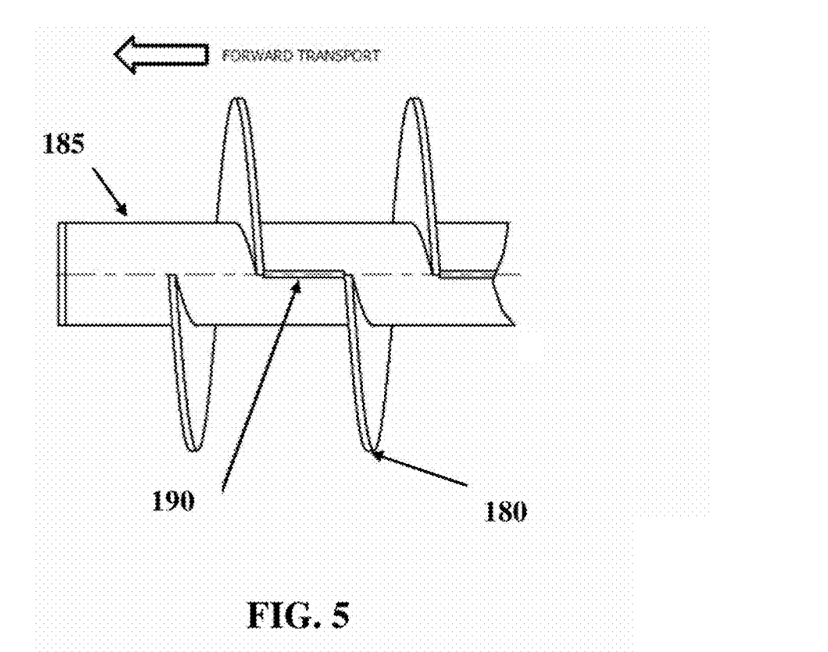
FIG. 5 is a detail of a paddle rotor with flat paddle at zero degree inclination angle.
Figure 6:
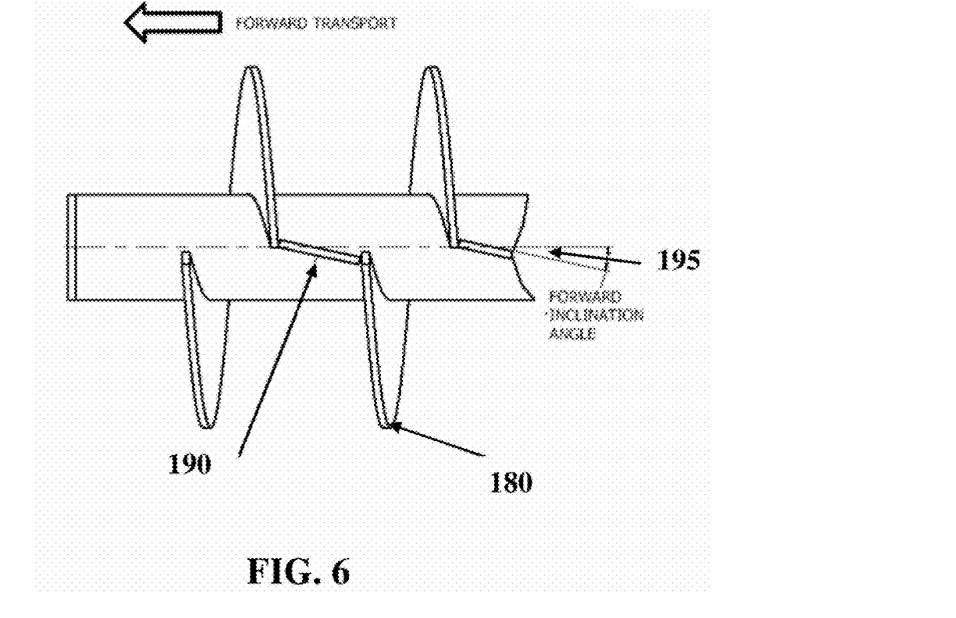
FIG. 6 is a detail of a paddle rotor with angled paddle at positive inclination angle.

Flat or Parallel Paddle Embodiments (FIGS. 5 & 6)

Figure 7:
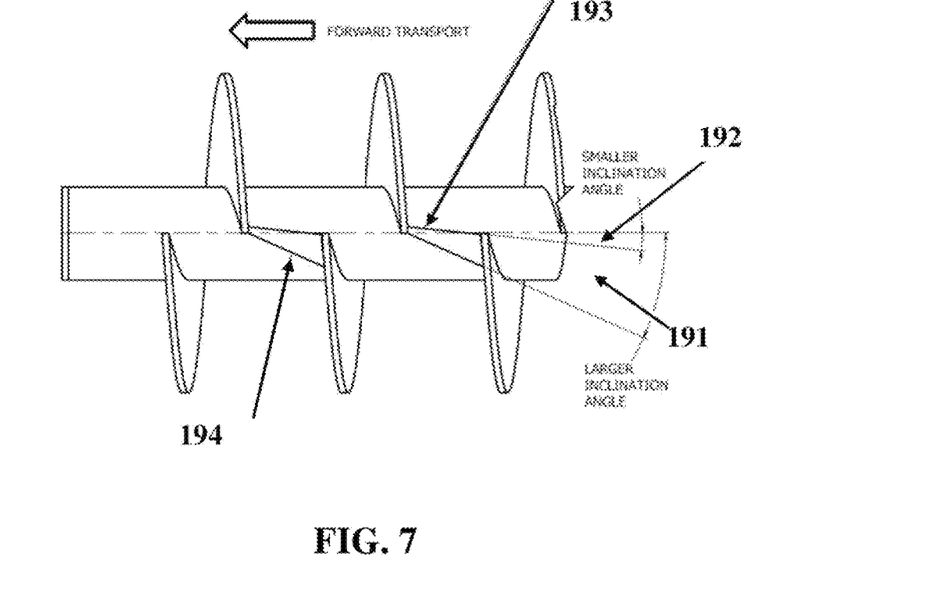
FIG. 7 is a detail of a paddle rotor with wedge paddle.

When the paddle surfaces parallel to each other and oriented at an angle ranging from 0° to 45° to the axis of the rotor, the material will be disturbed from a greater degree to lesser degree as the angle increases. For example, FIG. 5 shows a paddle having an angle 195 of 0°, or parallel to the axis of the rotor and FIG. 6 shows a paddle having an angle 195 of 30° to the axis of the rotor. Conversely, the transport characteristics of the paddle go from neutral to positive as the angle increases. The transport characteristics are the same whether operating in the forward or reverse direction all other variables being equal. The concept of the angular differences is shown in FIG. 7, where a large inclination angle on the forward face results in moderate mixing and good forward transport, whereas a smaller angle provides good mixing and moderate transport. (FIGS. 5 and 6).

Triangular/Wedge-Shaped Paddle Embodiments (Parallel+ Angled) (FIG. 7)

With the "forward facing" paddle surface at an angle relative to the axis of the rotor (up to 45°), material will be disturbed and transported during forward running of the rotor. With the "rear facing" paddle surface at a shallower angle than the forward face, material will be disturbed to a greater extent and transported to a lesser extent during reverse running of the rotor. Additionally, the wedge geometry may be constrained in that the axial length should be less than 50% of the of the effective pitch. (FIGS. 4 & 7). Thus, to provide the effects described above, the angle 191 on the forward face 194 of the paddle 190 is larger than the angle 192 on the rear face 193 of the paddle 190.

Figure 8:
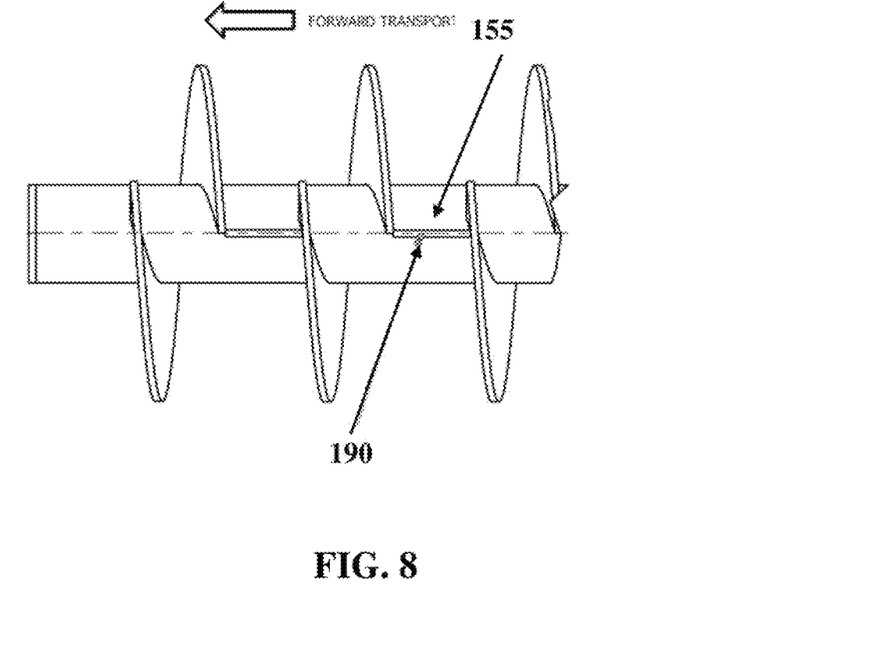
FIG. 8 is a detail of a paddle rotor with pocket paddle variant 1.
Figure 9:
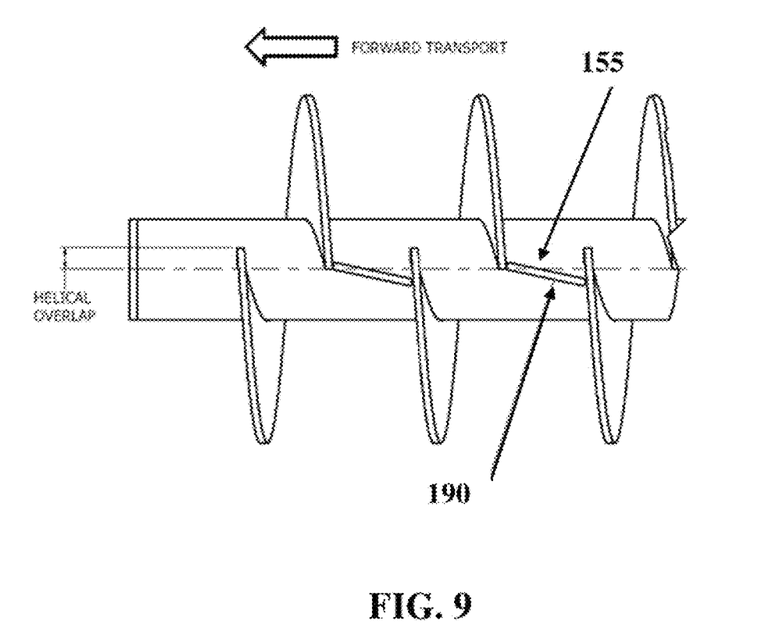
FIG. 9 is a detail of a paddle rotor with pocket paddle variant 2.
Figure 10:
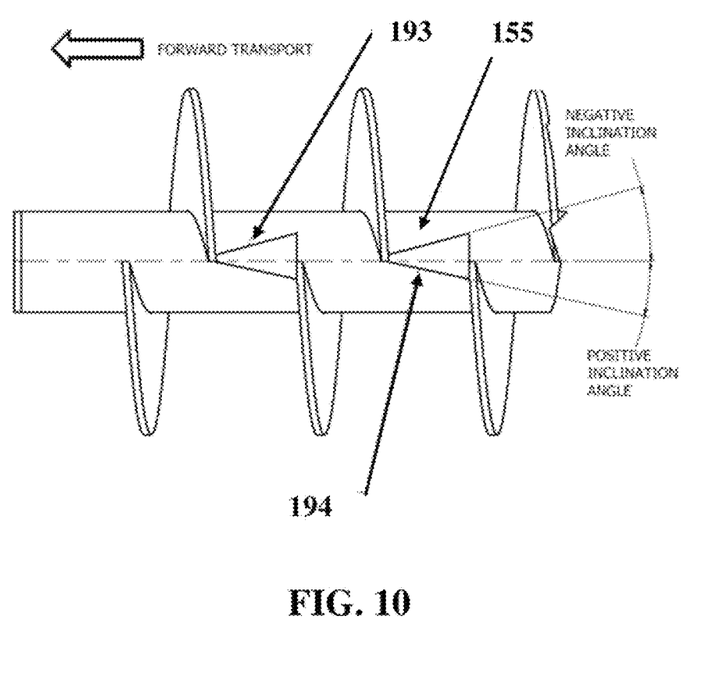
FIG. 10 is a detail of a paddle rotor with pocket paddle variant 3.

Pocket Paddle Embodiments (FIGS. 8, 9, & 10)

In this embodiment, the forward facing paddle surface is configured to be either parallel to, or at an angle to the axis of the rotor, such that material will be disturbed and transported during forward running of the rotor. However, in this embodiment, the rear facing paddle surface is configured to form a pocket 155. In such a configuration where the rear facing paddle surfaces is comprised of a shape to form a pocket (like a spoon or cupped hand) so that a volume of material will be captured, disturbed and carried over the rotor during reverse running of the rotor. Here, the rear face of the paddle is configured in a shape to enclose a volume to constrain and capture, rather than transport the material.

The pocket 155 in FIG. 8 is formed by having a rearward helical flight extend beyond to overlap the paddle 190. In FIG. 9, a similar structure is formed, except that the paddle 190 is inclined to provide some rearward transport when rotating in the rearward transport direction. FIG. 10 provides a wedge or triangular shaped paddle 155 that provides good capture while opposing rearward transport, to thereby provide maximum disturbance to the material. As in previous embodiments, the forward angle is preferably not to exceed 45° and the axial length should not exceed 50% of the effective pitch. The amount of helical overlap (the angular overlap between the end of a helical section and the next helical) used to create the pocket should not exceed 90° to prevent trapping material in the pocket.

Other Paddle Embodiments

Other configurations or design extensions are also possible. For example: curved or cupped paddle shapes, reverse angled pockets designed to affect both forward and reverse movements of the rotor, etc. The table below shows the effects of various paddle configurations.

| Paddle Type | Forward Disturbance | Forward Transport | Reverse Disturbance | Reverse Transport |
| --- | --- | --- | --- | --- |
| Flat Degree Paddle 0° | High | Neutral | High | Neutral |
| Flat Degree Paddle 20° | Moderate | Moderate | Moderate | Moderate |
| Flat Degree Paddle 45° | Low | High | Low | High |
| Wedge Paddle 20° Fwd, 0° Rev | Moderate | Low | High | Neutral |
| Wedge Paddle 30° Fwd, 10° Rev | Moderate | Moderate | Moderate | Low |
| Wedge Paddle 45° Fwd, 20° Rev | Low | High | Low | Moderate |

Wash Press Tank Configurations

As discussed, certain related art wash tanks have a drive end structural configuration that requires the rotor be removed through one end of the tank in an axial direction. This requires a clearance behind the drive end be equal to or greater than the length of the rotor. Thus, to remove the rotor for maintenance, the rotor must be supported and move horizontally a long distance. Due to the structure required to support the rotor end bearing, the drive and gearbox, these related art tank designs have not been configured to facilitate vertical rotor removal.

The embodiments described herein address these issues by creating, a removable cover that includes some of the structure of the drive end. Thus, when the top cover is removed from the tank, the drive end of the rotor can be lifted vertically before to rotor has cleared the drive end by being moved in the horizontal direction.

Figure 15:
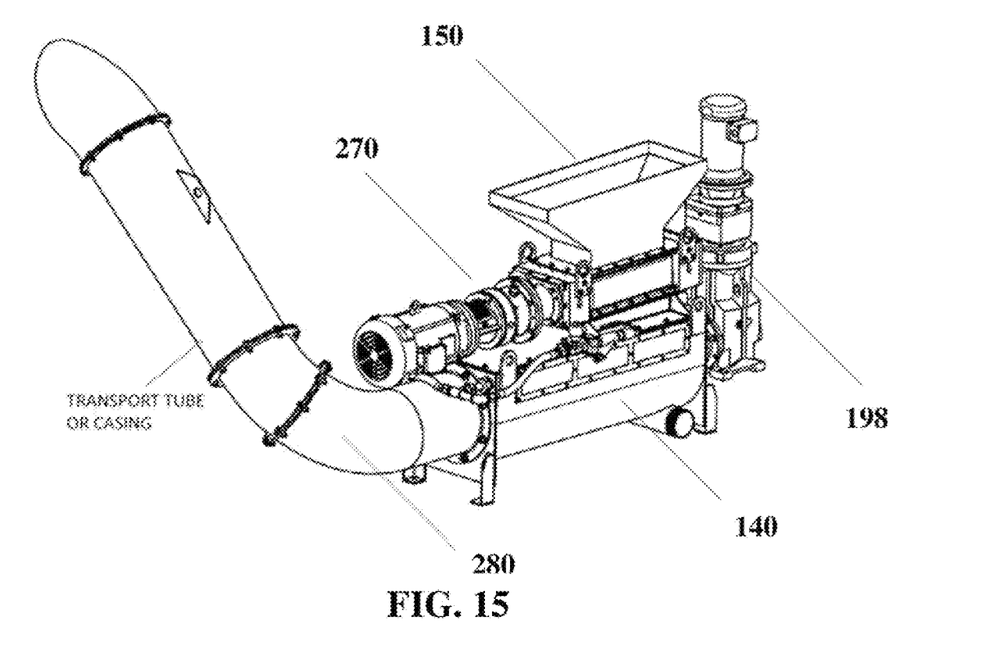
FIG. 15 is an isometric view showing typical wash press elements.
Figure 16A:
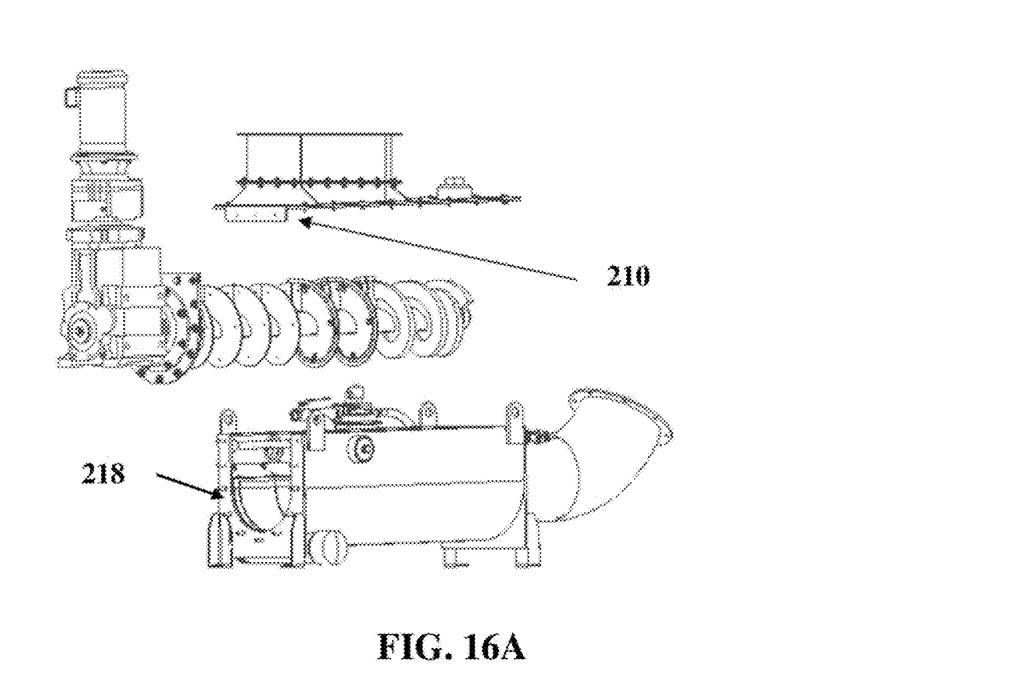
FIG. 16A is an isometric view of the wash press cover and interlocking flange.
Figure 16B:
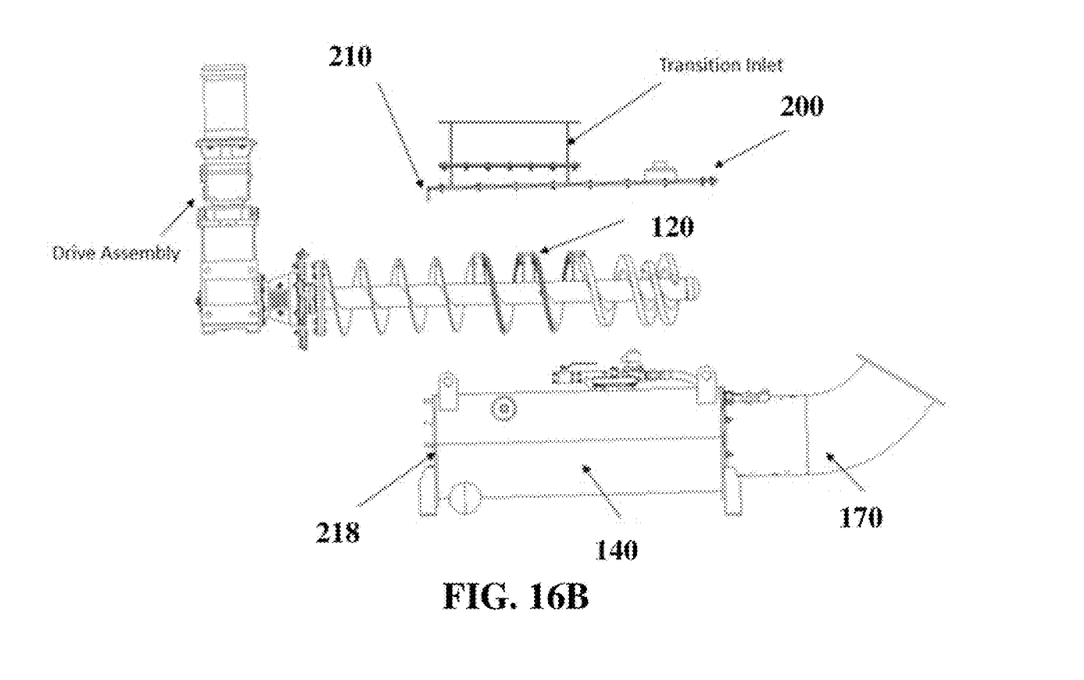
FIG. 16B is exploded view showing the wash press cover and vertical lift of the rotor.

As shown in FIG. 15, a wash press constructed in accordance with the exemplary embodiments includes a hopper 150 for receiving the solids from a channel screen and delivering them to a grinder 270 for solids reduction prior to delivery into the wash press 110. It should be noted, use of the grinder to create reduced solids is a preferred optional feature that can be removed if so desired, with the solids directly feeding from the hopper 260 into the wash press 110. These solids are delivered into the wash press 110, where free liquid is separated from the solids through an internal screen 130 and a spray wash 160 in the wash press tank 140. A helical rotor 120 transports the solids across the screen 130 with spray water supplied from a manifold washes the soft organics, such as human fecal matter, through the screen. The helical rotor 120 conveys the solids past the screen to a solid straight semi-cylindrical casing (tank 140) and then to an elbow or bent casing 280 that will create the resistance to create the compaction and further dewatering of the solids. In this area described above the helical rotor 120 will end and push the solids through the bend. As additional material enters this area a plug of solids forms and the weight along with the incline of the bend creates resistance that creates compaction and dewatering of the material.

The tank or casing 140 that houses the screen 130 is typically in a tubular or rectangular form comprised of an end plate 220 that allows the helical rotor shaft to pass through using a seat of some type. This drive shaft 185 of the screw is typically connected into a speed reducing gear box, in which a helical bevel or helical worm are common. However, any gear box that can provide the desired speed and torque output required could be used. The gear box is driven by an electric or hydraulic motor that provides the initial torque that is multiplied through the ratio of the gear box to provide the torque and ultimately the force required to push the solids plug through the bent casing and up an inclined tube for transport into a dumpster or other solids collection vessel.

The tank casing design provides a supporting structural component to the helical rotor assembly comprised of the motor, gearbox, seal, and helical rotor. The tank 140 must be constructed strong enough to support the forces generated to move the solids and provide sealing so the solids and liquids are contained.

Whereas current designs of wash press tanks contain an endplate 50 (FIG. 12) design that is solely part of the tank 40, such a configuration only permits a horizontal removal of the rotor 20 and requires a substantial amount of clearance in the area surrounding the wash press. In the exemplary embodiment depicted in FIGS. 1 and 13-18, the structure of the wash press tank 140 is configured to permit a vertical removal of the rotor 120, as well as removal of the screen 130. To accomplish this, the cover 200 is designed to include the upper part of the tank end plate, the end plate flange 210. Thus, the whole end plate structure includes an end plate tank portion 218, and an end plate flange portion 210 that separates from the end plate tank portion 218 when the cover 200 is removed. By allowing the top portion 210 of the end plate structure to separate with the tank's cover 200, while allowing the lower portion 218 of the end plate structure to remain with tank 140, vertical removal of the helical screw is permitted without having to move the rotor 120 along its full length in a horizontal direction to effectuate removal from the tank 140.

Additionally, in view of applications in which waste matter being processed is of a foul nature, it is important to provide effective sealing of the wash press. To accomplish this, in the embodiments described herein, the cover utilizes a flange 210 that is designed to align and seal with the tank's end plate 218. In this way, the end plate 220 of the tank and the end plate flange 210 of the cover 200 interlock and come to together to form the structural member needed for the wash press to function properly. Additionally, the interlock provides the sealing necessary to contain liquids in the tank. (See FIGS. 14 & 16A-16B)

The tank 140 may also be configured with an upper flange 215 configured to mate with the cover 200 to provide effective sealing in the upper portion of the tank 140, and a tank drive flange 218 to provide for mounting of the drive and the upper flange 210. Alternatively, the cover 200 may have flanges along its length to mate with the upper portions of the tank 140.

Another feature of this embodiment is the ability to remove the screen to facilitate replacement. With reference to FIG. 18, the screen 130 is shown removed from the tank. Due to having configuration where the screen is bolted to the tank (removably attached), screen replacement is simplified. As illustrated in FIG. 18, the tank has a mounting surface 132 configured to mate and seal with mounting portions 131 of the screen. Bolts or other removable fixing devices may be used to secure the screen 130 to the tank.

While this invention has been particularly shown and described with reference to exemplary embodiments thereof, the above description should be considered as illustrations of the exemplary embodiments only and are not for purposes of limitation. Therefore, the scope of the invention is defined not by the detailed description of the invention but by the appended claims, and all differences within the scope will be construed as being included in the present invention.

What is claimed is:

1. A wash press configured to separate liquids and solids from a waste stream comprising:
   a tank having a semi-cylindrical shape, the tank having an inlet at a top of the tank, a screen disposed in a portion of a bottom of the tank to permit liquid to pass therethrough, and an outlet for permitting solid materials to pass therethrough;
   a rotor having a plurality of helical flights interconnected by paddle members, the paddle members having surfaces extending at an angle more closely aligned to a rotation axis of the rotor than surfaces of the helical flights; and
   a drive configured to rotate the rotor;
   wherein the rotor is configured to transport solid and liquid materials along the tank from the inlet to the outlet in a forward transport direction, and to compress and disturb the solids in the tank to separate the liquid from the solid materials, and
   wherein the helical flights on opposite sides of the paddle members are configured to transport the solid and the liquid materials in a same direction.

2. The wash press according to claim 1, wherein adjacent ones of the helical flights are connected by a paddle member, the paddle member extending between the adjacent helical flights radially outward of a shaft of the rotor.

3. The wash press according to claim 2, wherein the paddle member extends between the adjacent helical flights in an axial direction of the shaft.

4. The wash press according to claim 2, wherein the paddle member extends at an angle to an axial direction of the shaft.

5. The wash press according to claim 3, wherein the paddle member extends at an angle such that when the rotor rotates to transport in the forward transport direction, a face of the paddle member facing the rotation direction faces the forward transport direction.

6. The wash press according to claim 4, wherein the angle is within the range of 0-45 degrees.

7. The wash press according to claim 5, wherein the paddle member has a wedge or triangular shaped profile as viewed from a radial direction such that a forward facing face and a rearward facing face are both angled to face the transport direction.

8. The wash press according to claim 2, wherein a helical flight rearward of the paddle member in the forward transport direction has an end extending circumferentially past the paddle member to form a pocket bounded by the a helical flight forward of the paddle member, the paddle member and the extending portion of the paddle member rearward of the paddle member.

9. The wash press according to claim 1, wherein the each of the plurality of helical flights interconnected by the paddle members are configured to meet the following expression:

$$(a) < 50\% \text{ of } (b);$$

where (a) is the length of a paddle member along the axial direction, and (b) is the length of the pitch of the helical flights in the axial direction.

\* \* \* \* \*